United States Patent [19]

Blakeman et al.

[11] Patent Number: 4,699,810

[45] Date of Patent: Oct. 13, 1987

[54] SEALING COMPOSITIONS

[75] Inventors: Peter J. Blakeman, Bedford; Terence R. Johnson, Huntingdon, both of England; Claes F. H. Pfeiffer, Epalinges, Switzerland

[73] Assignee: W. R. Grace & Co., Lexington, Mass.

[21] Appl. No.: 11,489

[22] Filed: Feb. 5, 1987

Related U.S. Application Data

[63] Continuation of Ser. No. 837,988, Mar. 10, 1986, abandoned.

[30] Foreign Application Priority Data

Mar. 19, 1985 [GB] United Kingdom ............... 8507095

[51] Int. Cl.$^4$ ............................................. B05D 5/00
[52] U.S. Cl. ................................. 427/244; 220/81 R; 220/357; 220/358; 427/284; 521/72; 521/54; 521/59; 521/139; 521/140
[58] Field of Search ............ 427/244, 284; 220/81 R, 220/357, 358; 521/72, 54, 59, 139, 140

[56] References Cited

U.S. PATENT DOCUMENTS

| | | | |
|---|---|---|---|
| 3,338,456 | 8/1967 | Kinnauy et al. | 220/358 |
| 3,515,569 | 6/1970 | Walters et al. | 521/54 |
| 3,592,782 | 7/1971 | Weber et al. | 51/54 |
| 3,615,972 | 4/1967 | Morehouse | 521/56 |
| 3,864,181 | 2/1975 | Wolinski et al. | 521/135 |
| 4,005,033 | 1/1977 | Georgeau et al. | 521/54 |
| 4,320,076 | 3/1982 | Greenwood | 521/59 |
| 4,419,459 | 12/1983 | Melchior | 521/54 |
| 4,451,584 | 5/1984 | Schaefer | 521/54 |

FOREIGN PATENT DOCUMENTS

| | | | |
|---|---|---|---|
| 3100746 | 7/1982 | Fed. Rep. of Germany . | |
| 1489081 | 6/1967 | France | 220/358 |

Primary Examiner—Morton Foelak
Attorney, Agent, or Firm—John Dana Hubbard; William L. Baker

[57] ABSTRACT

A storage-stable container sealing composition which is fluid and comprises an aqueous dispersion of a visco elastic, generally elastomeric, polymer and hollow microspheres of a thermoplastic polymeric material containing a liquid blowing agent. The compositions are applied as gaskets to container closures and are heated to volatilize the blowing agent and expand the microspheres.

7 Claims, No Drawings

SEALING COMPOSITIONS

This is a continuation of application Ser. No. 837,988, filed Mar. 10, 1986, now abandoned.

The present invention relates to compositions for use in sealing containers, especially for providing gaskets in drum and pail covers or ends.

In U.S. Pat. No. 4,005,033 there are disclosed mastic compositions comprising a polymer latex and hollow resilient organic microspheres. The mastic compositions are formed by mixing the latex with beads which contain a liquid blowing agent, heating the composition to evaporate the liquid blowing agent and expand the beads, and cooling the composition to give a lightweight foamed composition for use as a sealant or an adhesive. The compositions disclosed are highly viscous, that is they have a Brookfield viscosity of at least 50,000 mPas. The polymer latices do not comprise elastomeric polymers and do not cure on heating. The compositions have a high polymer concentration, for instance up to 40% by weight in the composition. The disclosed compositions would not be useful for providing sealants for containers.

It is known to use foamed compositions, that is having a cellular structure, in closures for bottles and jars, in removable covers for drums, pails and cans and in fixed ends in drums and cans. The composition may be foamed either before, during or after application to the closure, cover or fixed end. Pre-foamed compositions based on plastisols, liquid melts or aqueous dispersions may be foamed by mechanically beating in air or other gas or by the incorporation and activation of a chemical foaming agent. Liquid melt compositions may be foamed as they are deposited onto closures by the injection of gas under presure within the applicator.

It is often preferable, however, to foam the compositions after their application to the closure, cover or end, especially in the case of drum ends used in a wet seaming process, i.e. when the end is fixed to the drum walls before curing of the composition. When foaming is to be caused after application to container covers or ends this is generally achieved by including chemical foaming agents in the composition. In the case of plastisol compounds the chemical foaming agent is stable in the sealing composition. However in the case of sealing compositions, such as those commonly used for drum and pail covers, which are preferably aqueous based latices or dispersions, the chemical foaming agents undergo hydrolysis which limits the storage life of the composition to no more than one or two days. For this reason such compositions must be provided as two components, one of which contains the foaming agent, to be mixed together shortly before use, which is inconvenient to the manufacturer.

In the present invention a fluid container sealing composition comprises an aqueous dispersion of a visco elastic polymer characterised in that it comprises also hollow microspheres of a thermoplastic polymeric material containing a liquid blowing agent, the composition having a Brookfield viscosity below 20,000 mPas, (measured on a Brookfield LVF 5X viscometer using spindle 4 at 60 rpm and 21° C.).

The aqueous dispersion may be made by dispersing solid polymer into an aqueous medium by milling and adding other ingredients before, during or after milling, but is preferably an aqueous latex of the visco elastic polymer. The compositions are formed by blending the components together by conventional blenders or mixers.

The polymer is of a type used in conventional gaskets for container closures. Thus it shows visco elastic properties. The polymer is generally elastomeric and preferably a rubbery polymer, although it may be of a type not generally described as elastomeric, such as plasticised poly vinyl chloride or styrene acrylic ester copolymer. The latex may therefore be a natural rubber latex or may be an emulsion of a synthetic polymer in an aqueous continuous phase.

Suitable synthetic polymers include butyl rubber, polychloroprene, butadiene-acrylonitrile copolymer, acrylonitrile-butadiene-styrene terpolymer, polybutadiene, polyvinylidene chloride homopolymer, polyvinylidene chloride copolymers, plasticised polyvinyl chloride, polyvinylchloride copolymers, plasticised polyvinyl proprionate, polyvinyl propionate copolymers, polyacrylic acid copolymers, polymethacrylic acid copolymers, plasticised polystyrene, styrene-butadiene rubbers, carboxylated styrene-butadiene copolymers, styrene acrylic ester copolymers and carboxylated styrene acrylic copolymers. Blends may be used. Natural rubber latices are, however, found to be particularly suitable in processes according to the invention.

The polymers preferably are vulcanisable. The compositions may be prepared with a pre-vulcanised latex or with an unvulcanised latex together with a suitable vulcanising system. Suitable vulcanising systems comprise sulphur, zinc dibutyl dithiocarbamate and dipentamethylene thiuram hexasulphide plus dipentamethylene thiuram disulphide mixtures in amounts of 0.2 to 5.0 parts per 100 parts of rubber, 0.3 to 2.0 parts per 100 parts of rubber and 0 to 1.0 parts per 100 parts of rubber respectively.

The hollow beads in the compositions have a shell of a thermoplastic polymer and contain a blowing agent. The blowing agent is generally a volatile liquid, such as a low hydrocarbon for instance a $C_{3-8}$ alkane or cycloalkane, preferably isobutane or propane. When the beads are heated the blowing agent volatilises and expands the softened thermoplastic shell to expand the spheres. The shell is preferably formed of an arcylic polymer or copolymer and is preferably a copolymer of acrylonitrile and vinylidene chloride. The diameter of the spheres before foaming is suitably in the range 5 to 30 microns, preferably in the range 8 to 15 microns, usually about 10 microns. The spheres expand to a diameter of up to 10 to 100 microns, preferably up to an average diameter of about 40 microns. The microspheres are generally added in an amount of up to 50 to 100 parts per 100 parts of rubber by weight (phr), preferably up to 30 phr, and usually at levels in the range 2 to 15 phr.

The compositions may comprise conventional additives, generally containing a filler, preferably inorganic filler such as talc, kaolin, colloidal silica and other silicaceous fillers, synthetic silicate, calcium carbonate or sulphate, aluminium hydroxide, dolomite, aluminium or barium sulphate, zinc oxide, or magnesium oxide or carbonate or silicate. Such fillers may have been surface treated, for instance in conventional manner. The compositions may comprise pigment fillers, for instance titanium dioxide, iron oxide or carbon black. The filler and pigment are generally present in an amount up to 500 phr and generally less than 300 phr.

Instead of modifying the colour of the composition by including particulate pigment, some other colouring material, for instance soluble dye, may be included.

The compositions generally contain at least one stabiliser for stabilising the dispersion. This stabiliser may be selected from any of the materials conventionally used for stabilising sealing compositions based on filled polymer latices. Such stabilisers include styrene maleic anhydride copolymers or other styrene copolymers, methyl cellulose, polyacrylamide, ethoxylate condensates, ethoxylates of alkyl phenol and fatty acids, polyvinyl pyrrolidone, ammonium oleate, ammonium and alkali metal salts of rosin acid or fatty acids and casein. Such stabilisers may be used in admixture, for instance with other materials. Other surface active agents may be included in the compositions, such as those known in the art.

The compositions may include tackifying resins. Suitable materials are well known and are generally selected from synthetic hydrocarbon or petroleum resins, polyterpene resins, phenolic resin modified with natural resins such as rosin or terpene, xylene formaldehyde resin and modified products thereof, and esterified rosins or other rosin type resins such as rosin, hydrogenated rosin, polymerised rosin or hardened rosin. The amount of tackifier is generally up to 200 phr and preferably up to 100 phr.

The compositions may also contain a plasticiser. Suitable plasticisers are white oil, or other hydrocarbon oil or phthalate plasticisers, that softens the polymer and are generally used in amounts of up to 50 phr, preferably below 30 phr.

The compositions preferably also include humectants such as glycerol to retard the drying process of the gasket before heating so that the gasket still remains sufficiently soft and compliant to allow the microspheres to expand.

The compositions may include minor amounts, e.g. up to 5 phr or at most up to 20 phr of other additives that are known to those skilled in the art and that are conventional in filled latex sealing compositions, such as viscosity increasing agents (for instance ammonium alginate, hydroxypropyl methyl cellulose, methyl cellulose, carboxymethyl cellulose, high molecular weight polyacrylic acid, bentonite or gum karaya), bactericides, corrosion inhibitors, surfactants, anti-oxidants (for instance phenolic or amino anti-oxidants) and pH adjusters (for instance ammonia, primary amine, sodium hydroxide or sodium carbonate).

The liquid composition preferably contains less than 90% of solids by weight including filler. Generally the solids are at least 50% by weight of the composition and preferably in the range 75 to 85% by weight. The viscoelastic polymer is present in an amount between 10 to 60% dry weight polymer on the total composition, generally in the range of 20 to 50% by weight.

The fluid characteristics of the compositions must permit their use as container sealing compositions. Their viscosity is generally below 30,000 mPas and above 2,000 mPas and preferably in the range 5,000 to 20,000 mPas, the viscosity being measured on a Brookfield LVF 5X viscometer using spindle 4 at 60 rpm at a temperature of 21° C.

In the invention the new compositions are used in a process for providing containers and container closures with a sealing gasket, in which the composition is deposited on or into the inner surface, usually on to the rim, of the closure and is then heated to expand the microspheres, before or after securing the closure to the container. The process is particularly of value in drum and pail covers and ends but can also be used for other types of closures which may be made of metal, glass or plastic.

The heating step softens the thermoplastic shell of the microspheres and volatilises the blowing agent so that the shell expands. The closure is for instance heated at a temperature in the range 50° to 160° C., generally 80° to 150° C., preferably 100° to 140° C. for a period in the range 1 to 60 min, preferably 10 to 30 min. The heating step may be combined with a paint or lacquer curing or drying step.

Drum covers are generally removable and reusable. When they are provided with a gasket by the process of the invention the composition is generally dried and, if the composition is vulcanisable, cured and the covers stored for later use or sold to the drum user. Heating the cover causes the composition to foam and also dries and (if applicable) cures the viscoelastic polymer composition.

The process of the invention may also be used to provide gaskets on drum ends. The drum end may be heated to foam and dry and (if applicable) cure the composition immediately after it has been deposited. The resultant cover carrying the gasket may be used immediately thereafter by fixing to a drum or may be stored for later use.

Alternatively an end carrying a gasket of liquid composition may be immediately fixed to a drum, the whole drum subsequently being heated, for example during a lacquer or paint stoving cycle to foam and dry and (if applicable) cure the composition. The process of the invention is particularly useful in this type of "wet seaming" process, since it is found that during heating the composition expands into any voids, cracks or holes in the drum seam around the drum end, especially where the side seam meets the bottom seam, to minimise leakage.

The gaskets of foamed composition on drum covers may be up to 20 mm thick, generally however the average thickness is less than 10 mm often about 5 mm. Gaskets on drum ends are up to 5 mm thick, generally having an average thickness of up to 2 mm and usually about 1 mm.

The invention is further illustrated in the following example.

EXAMPLE 1

A liquid composition for providing a drum end with a foamable gasket is formed from the following ingredients.

Barytes 186.0 phr
Kaolin 102.2 phr
Natural rubber latex 96.0 phr (dry weight polymer)
Butadiene-acrylonitrile latex 4.0 phr (dry weight polymer)
Antioxidant 1.9 phr
Pigment 1.9 phr
Surfactant 2.7 phr
Sulphur 0.23 phr
Accelerator 0.35 phr
Zinc Oxide 0.24 phr
Acrylonitrile/vinylidene chloride microbeads containing isobutane 5.0 phr.

The composition was applied to a drum seal as a gasket at a thickness of 1.7 mm. The seal was heated, to foam and dry the composition and also to cure it, to a temperature of 125° C. after a period of 20 min. The thickness of the resulting gasket was 2.4 mm.

A composition having the same components but with 10 phr microbeads, applied at a thickness of 1.7 mm, expanded to a thickness of 2.8 mm after heating.

EXAMPLE 2

A composition for providing a drum cover with a sealing gasket was made by mixing the following ingredients.
Whiting 156.0 phr
Natural rubber latex 100 phr (dry weight polymer)
Antioxidant 1.0 phr
Surfactants 6.2 phr
Sulphur 1.97 phr
Accelerator 1.97 phr
Zinc oxide 0.99 phr
Microbeads (as above) 2.5 phr The composition was deposited on to a drum cover in a conventional manner. The cover was heated to a temperature of 125° C. for a period of 20 min. to foam and dry the composition and to cure it. The resulting gasket had a thickness of 5 mm. A similar composition not containing the microbeads which was treated similarly resulted in a gasket with a thickness of 3 mm.

EXAMPLE 3

A composition for providing a pail cover with a sealing gasket was made by mixing the following ingredients such that air was also mechanically incorporated:
Ground silica 200 phr
Prevulcanised natural rubber latex 100 phr (dry polymer weight)
Naphthenic oil 20 phr
Sulphur 4.0 phr
Accelerators 2.55 phr
Zinc ammonium benzoate 1.0 phr
Surfactant 4.3 phr
Acrylonitrile/vinylidene chloride microbeads containing isobutane 2.5 phr The composition was deposited on to a drum cover in a conventional manner was heated to a temperature of 125° C. for a period of 20 minutes to foam and dry the composition and also to cure it. The resultant gasket had a thickness of 4.18 mm and a specific gravity of 0.57. A similar composition not containing the microbeads which was treated similarly resulted in a gasket with thickness of 3.14 mm and a specific gravity of 0.70.

What we claim is:

1. A process for providing a container closure with a foamed sealing gasket comprising depositing a foamable container sealing composition, having an aqueous dispersion of a viscoelastic polymer and hollow microspheres containing a liquid blowing agent, onto a rim of the closure, heating the closure to foam the composition and securing the closure to a container.

2. A process according to claim 1 wherein the closure is heated at a temperature from about 80° to about 160° C. for a period from about 1 to about 60 minutes.

3. A process according to claim 2 wherein the closure is heated at a temperature from about 100° to about 140° C., for a period of from about 10 to about 30 minutes.

4. A process according to claim 1 wherein before the heating step, a coating is applied to the closure and the container and the heating step dries and cures the coating.

5. A process according to claim 4 wherein the coating is selected from the group consisting of lacquer and paint.

6. A process according to claim 1 wherein the diameter of the expanded microspheres is from about 10 to about 100 microns.

7. A process for providing a container closure with a foamed sealing gasket comprising the steps of depositing a foamable sealing composition of an aqueous dispersion of a viscoelastic polymer and hollow microspheres containing a blowing agent into a rim of the closure, securing the closure onto a container and heating the closure to volatilize the blowing agent and expand the microspheres to form a foamed sealing gasket.

* * * * *